Dec. 21, 1926.
W. E. KNOTT
1,611,202
SAW SET
Filed July 22, 1926
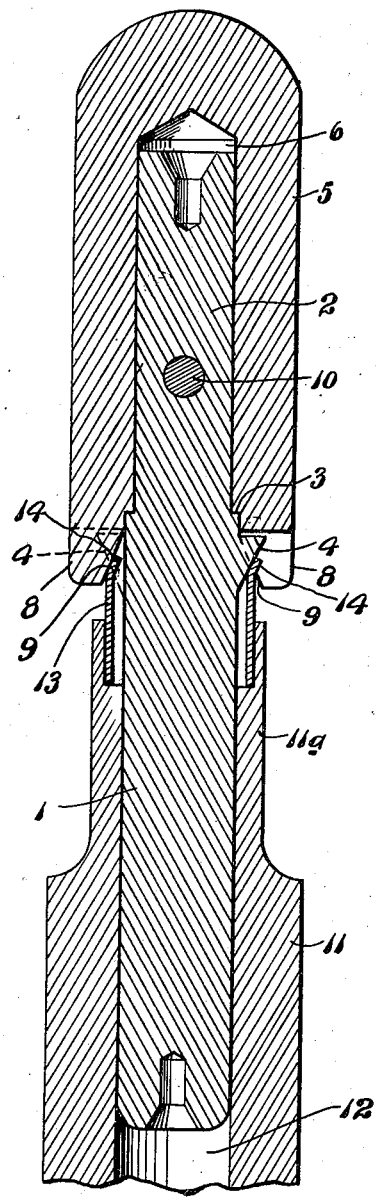
Fig. 1.
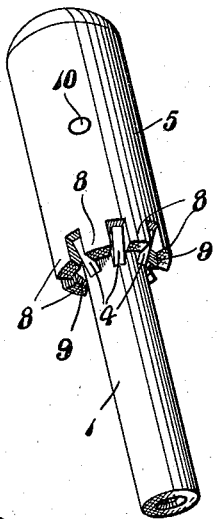
Fig. 2.
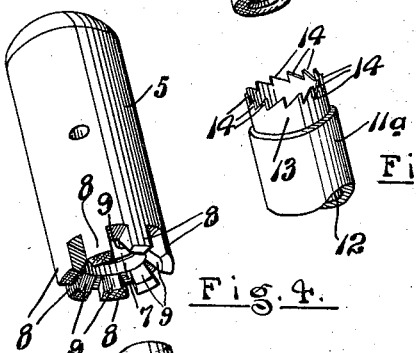
Fig. 3.
Fig. 4.
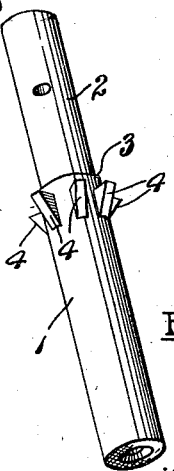
Fig. 5.
Inventor
Warren E. Knott.
By Frank E. Liverance Jr.
Attorney.

Patented Dec. 21, 1926.

1,611,202

UNITED STATES PATENT OFFICE.

WARREN E. KNOTT, OF GRAND RAPIDS, MICHIGAN, ASSIGNOR TO PIONEER PEARL BUTTON COMPANY, OF POUGHKEEPSIE, NEW YORK, A CORPORATION OF NEW YORK.

SAW SET.

Application filed July 22, 1926. Serial No. 124,161.

This invention relates to a saw set particularly adapted for setting teeth of saws of tubular or cylindrical form. One place where such saws are used to a large extent is in sawing button blanks from shells in the manufacture of pearl buttons. The saws require frequent changing and used saws have to be filed and set after use thereof. Heretofore it has been common practice to set the saw teeth individually, this requiring a highly skilled mechanic and the setting of each saw taking considerable time.

In the present invention, it is an object and purpose thereof to provide a saw set where all of the teeth of a cylindrical saw may be set simultaneously and with which skilled labor is not needed, one blow of a hammer or like tool on the set of my invention being all that is required, and no particular or extra care or skill being needed. A further object of the invention is to make a tool for setting cylindrical or tubular saws which is simple in construction, easily manufactured at low cost, and which is durable and efficient in service. To these ends, as well as many others, not at this time specifically stated, but which will appear as understanding of the invention is had, I have made the construction described in the following description and illustrated in the accompanying drawing, in which, Fig. 1 is an enlarged central vertical section through the saw set, showing the same as used in setting a cylindrical saw.

Fig. 2 is a perspective view of the saw set of my invention.

Fig. 3 is a perspective view of the saw and upper end of the holder therefor which is to be set with the said device.

Fig. 4 is a perspective view of the upper member of the saw set, and

Fig. 5 is a perspective view of the lower member of the saw set, the same being connected with the upper member in the assembled device.

Like reference characters refer to like parts in the different figures of the drawing.

In the construction of the saw set, a cylindrical member 1 is provided, at the upper end of which is a cylindrical extension 2 of smaller diameter integral with the part 1, there being a shoulder 3 at the adjoining ends of the parts 1 and 2. A short distance below the shoulder 3 a plurality of spaced outwardly extending radial projections 4 are located integral with the member 1 and having forwardly and inwardly inclined outer edges as shown, the upper edges of all of the projections lying in the same horizontal plane. The members 1 and 2 and the projections 4 thereon are all formed from an integral piece of metal, preferably steel, and the projections 4 are hardened in any desired manner so as to be able to resist wear and abrasion.

Over the upper part 2 of the structure described, a second member is placed. This second member comprises a cylindrical body of metal 5 of larger diameter than the first described member 1 or its extension 2, the same being interiorly bored from its lower end upwardly nearly to its upper end, making the cylindrical opening 6 into which the part 2 is inserted. At the lower end of the body 5 the opening is slightly enlarged in diameter, as at 7, whereby the upper end of the lower and larger section 2 may be received therein, the shoulder 3 seating against the upper end of the recess at 7.

The lower end of the body 5 is milled to form a consecutive series of spaced apart downwardly extending projections 8, each of which on its inner side is cut with an upward and inward incline, making the inclined inner faces 9. When the body 5 is placed over the part 2, the projections 4 come between the projections 8 on the body 5, and the upper horizontal edges of said projections 4 lie a very short distance below the upper sides of the slots in which they are located between said projections 8. A pin 10 is passed through the body 5 and part 2 in order to securely hold the same against movement with respect to each other.

The projections 4 and 8 are equal in number to the teeth in a saw to be set. The saw is ordinarily held in a cylindrical holder 11, having a reduced upper end portion 11ª, there being a central longitudinal cylindrical opening 12 through the holder. The saw 13 of tubular or cylindrical form is held at the upper end of the reduced portion 11ª in a cylindrical recess somewhat larger in diameter than the diameter of the opening 12, the teeth 14 of the saw being presented upwardly to the saw set. The saw set is applied to the saw by inserting the lower guide portion 1 into the opening 12. Each alternate tooth of the saw is brought against the inclined outer edge of a projection 4, and the other teeth against the inner inclined sides of the projections 8. By striking the upper end of the body 5 a blow with any suitable hammer or mallet, all of the teeth will be properly set at one and the same time, the saw teeth alternately being bent inwardly and outwardly as is desired. The material of the body 5 and its saw setting projections 8 is also such that it may be properly hardened to resist wear and abrasion such as might result from contact with the tempered steel saw teeth.

This saw set described is very practical and efficient. It saves large expense in the skilled labor heretofore required to set the teeth of cylindrical saws, and insures that all of the teeth shall be properly set, doing better work than the best of skilled mechanics. The construction is simple, and easily manufactured at low cost. The invention is defined in the appended claims, and is to be considered comprehensive of all forms of structure coming within their scope.

I claim:

1. A device of the class described, comprising a body formed at its lower end with a plurality of spaced downwardly extending projections having upwardly and inwardly inclined inner sides, and a member located at the lower end of said body having a plurality of outwardly extending projections spaced apart and extending into the spaces between said first named projections and having downwardly and inwardly inclined outer edges.

2. A device of the class described, comprising a cylindrical body formed at its lower end with a plurality of equally spaced downwardly extending projections having upwardly and inwardly inclined inner sides, and a member connected to said body at its lower end having a plurality of equally spaced radially extending projections with inwardly and downwardly inclined outer edges, said last named projections lying between the first named projections, with the planes of the inner sides of said first named projections crossing the planes of the outer edges of the last named projections.

3. A device of the class described, comprising a cylindrical body having an opening formed therein from its lower end upwardly for a distance and having, at its lower end, a plurality of equally spaced downwardly extending projections with upwardly and inwardly inclined inner sides, and a member having an upper portion inserted into said opening in the body and secured to said body and having a plurality of spaced radial outwardly extending projections located in the spaces between the first named projections and having downwardly and inwardly inclined outer edges.

4. A device of the class described, a construction having the elements in combination defined in claim 3, combined with a downwardly extending guide rod connected to and located below and in alinement with said member.

5. A device of the class described, comprising a cylindrical body having a cylindrical opening formed therein from its lower end upwardly for a distance, said opening at its lower end being increased in diameter over its upper portion, said body also having a plurality of equally spaced projections at its lower end formed with upwardly and inwardly inclined inner sides surrounding said opening, and a member comprising an upper cylindrical section and a lower cylindrical section of larger diameter connected to said body with the upper cylindrical section received in the opening in the body and with the upper end of the larger lower cylindrical section received in the enlarged lower end portion of said opening, and a plurality of spaced radial outwardly extending projections adjacent the upper end of said larger lower section of said member located between the first named projections and having downwardly and inwardly inclined outer edges.

In testimony whereof I affix my signature.

WARREN E. KNOTT.